(12) United States Patent
Stewart

(10) Patent No.: US 11,417,013 B2
(45) Date of Patent: Aug. 16, 2022

(54) ITERATIVE LAYOUT MAPPING VIA A STATIONARY CAMERA

(71) Applicant: Sensormatic Electronics, LLC, Boca Raton, FL (US)

(72) Inventor: Michael C. Stewart, Delray Beach, FL (US)

(73) Assignee: Sensormatic Electornics, LLC, Boca Raton, FL (US)

( * ) Notice: Subject to any disclaimer, the term of this patent is extended or adjusted under 35 U.S.C. 154(b) by 0 days.

(21) Appl. No.: 17/069,553

(22) Filed: Oct. 13, 2020

(65) Prior Publication Data

US 2022/0114747 A1 Apr. 14, 2022

(51) Int. Cl.
*G06T 7/70* (2017.01)
*G06T 7/20* (2017.01)
(Continued)

(52) U.S. Cl.
CPC ............... *G06T 7/70* (2017.01); *G06T 7/20* (2013.01); *G06T 7/60* (2013.01); *G06T 7/80* (2017.01); *H04N 7/183* (2013.01); *G06T 2207/10016* (2013.01); *G06T 2207/20081* (2013.01); *G06T 2207/30196* (2013.01); *G06T 2207/30232* (2013.01); *G06T 2207/30241* (2013.01); *G06T 2207/30244* (2013.01)

(58) Field of Classification Search
CPC .... G06T 7/70; G06T 7/20; G06T 7/80; G06T 7/60; G06T 2207/20081; G06T 2207/30196; G06T 2207/10016; G06T 2207/30244; G06T 2207/30232; G06T 2207/30241; H04N 7/183
See application file for complete search history.

(56) References Cited

U.S. PATENT DOCUMENTS

2012/0081552 A1* 4/2012 Sablak ............... H04N 5/23299
  348/169
2013/0169822 A1* 7/2013 Zhu ........................... G06T 7/80
  348/180
(Continued)

OTHER PUBLICATIONS

Hiroki, English Translation of JP 2019009752 A (Year: 2017).*

*Primary Examiner* — Joseph G Ustaris
*Assistant Examiner* — Jill D Sechser
(74) *Attorney, Agent, or Firm* — Arent Fox Schiff

(57) ABSTRACT

Disclosed herein are apparatuses and methods for iteratively mapping a layout of an environment. The implementations include receiving a visual stream from a camera installed in the environment, wherein the visual stream depicts a view of the environment, and wherein positional parameters of the camera and dimensions of the environment are set to arbitrary values. The implementations include monitoring a plurality of persons in the visual stream. For each person in the plurality of persons, the implementations further includes identifying a respective path that the person moves along in the view, updating the dimensions of the environment captured in the view, based on an estimated height of the person and movement speed along the respective path, and updating the positional parameters of the camera based on the updated dimensions of the environment. The implementations further includes mapping a layout of the environment captured in the view of the camera.

13 Claims, 5 Drawing Sheets

(51) Int. Cl.
    *G06T 7/60*     (2017.01)
    *G06T 7/80*     (2017.01)
    *H04N 7/18*     (2006.01)

(56) References Cited

U.S. PATENT DOCUMENTS

| | | | |
|---|---|---|---|
| 2019/0266755 A1* | 8/2019 | White | G06T 7/80 |
| 2019/0349533 A1* | 11/2019 | Guo | G06F 3/16 |
| 2021/0027493 A1* | 1/2021 | Citraro | G06N 7/005 |
| 2021/0142497 A1* | 5/2021 | Pugh | G06T 7/60 |
| 2021/0182560 A1* | 6/2021 | Richards | H04N 7/181 |

\* cited by examiner

ITERATIVE LAYOUT MAPPING VIA A STATIONARY CAMERA

TECHNICAL FIELD

The described aspects relate to mapping systems.

BACKGROUND

Aspects of the present disclosure relate generally to mapping systems, and more particularly, to iteratively mapping the layout of an environment using a stationary camera.

Simultaneous localization and mapping (SLAM) algorithms are often used to determine the layouts of environments right down to their exact measurements. In SLAM, a camera/depth sensor is guided along a path in an environment that ideally has stationary objects. Using the information collected along the path and knowing how fast the camera/depth sensor was moving or how far the camera/depth sensor moved, a detailed layout of the environment can be generated.

There are situations, however, where a layout of an environment may be desired while the camera is kept stationary. For example, a security camera may be installed in an arbitrary position in a shopping mall and landmarks such as walkways, doors, etc., may need to be identified. Information such as the physical parameters (e.g., installation height, tilt angle, etc.) of the camera may be unknown. Here, SLAM algorithms will be ineffective for mapping because the security camera does not move. Furthermore, simple image classification to identify walkways and doors will be ineffective because the measurements of the walkways and doors would not be determined.

Accordingly, there exists a need for improvements in mapping systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for iteratively mapping a layout of an environment, comprising receiving a visual stream from a camera installed in the environment, wherein the visual stream depicts a view of the environment, and wherein positional parameters of the camera and dimensions of the environment are set to arbitrary values. The method further monitoring a plurality of persons in the visual stream. For each person in the plurality of persons, the method further includes identifying a respective path that the person moves along in the view, updating the dimensions of the environment captured in the view, based on an estimated height of the person and movement speed along the respective path, and updating the positional parameters of the camera based on the updated dimensions of the environment. The method further includes mapping a layout of the environment captured in the view of the camera.

Another example implementation includes an apparatus for iteratively mapping a layout of an environment, comprising a memory and a processor configured to communicate with the memory. The processor is configured to receive a visual stream from a camera installed in the environment, wherein the visual stream depicts a view of the environment, and wherein positional parameters of the camera and dimensions of the environment are set to arbitrary values. The processor is configured to monitor a plurality of persons in the visual stream. For each person in the plurality of persons, the processor is configured to identify a respective path that the person moves along in the view, update the dimensions of the environment captured in the view, based on an estimated height of the person and movement speed along the respective path, and update the positional parameters of the camera based on the updated dimensions of the environment. The processor is configured to map a layout of the environment captured in the view of the camera.

Another example implementation includes an apparatus for iteratively mapping a layout of an environment, comprising means for receiving a visual stream from a camera installed in the environment, wherein the visual stream depicts a view of the environment, and wherein positional parameters of the camera and dimensions of the environment are set to arbitrary values. The apparatus further includes means for monitoring a plurality of persons in the visual stream. Additionally, the apparatus further includes means for, for each person in the plurality of persons, (1) identifying a respective path that the person moves along in the view, (2) updating the dimensions of the environment captured in the view, based on an estimated height of the person and movement speed along the respective path, and (3) updating the positional parameters of the camera based on the updated dimensions of the environment. Additionally, the apparatus further includes means for mapping a layout of the environment captured in the view of the camera.

Another example implementation includes a computer-readable medium for iteratively mapping a layout of an environment, executable by a processor to receive a visual stream from a camera installed in the environment, wherein the visual stream depicts a view of the environment, and wherein positional parameters of the camera and dimensions of the environment are set to arbitrary values. The instructions are further executable to monitor a plurality of persons in the visual stream. For each person in the plurality of persons, the instructions are further executable to identify a respective path that the person moves along in the view, update the dimensions of the environment captured in the view, based on an estimated height of the person and movement speed along the respective path, and update the positional parameters of the camera based on the updated dimensions of the environment. Additionally, the instructions are further executable to map a layout of the environment captured in the view of the camera.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that map the layout of environment via a camera that can be installed in any arbitrary position in the environment. Unlike SLAM, where the camera is moved and all other objects in the environment remain stationary, in the present disclosure the installed camera remains stationary and relies on the movement of people to estimate distance and the dimensions of the environment. This allows for a greater use of cameras that are installed in one position such as security cameras in offices, supermarkets, etc.

Figure 1:
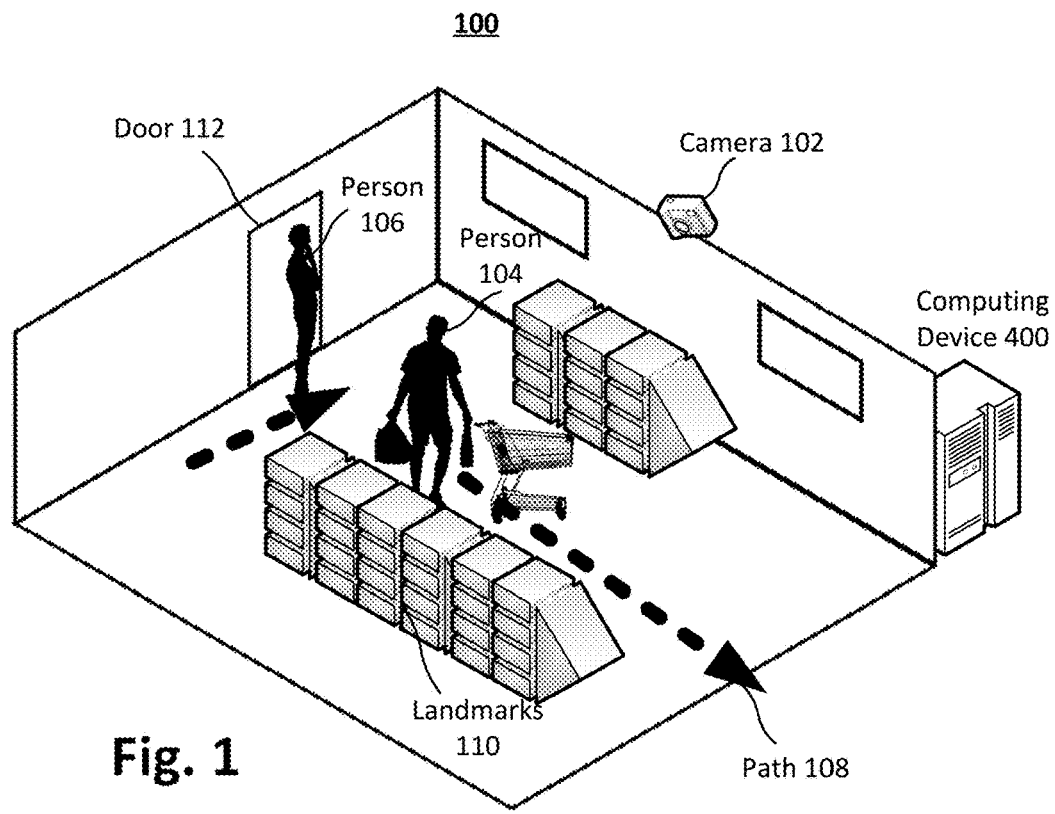
FIG. 1 is a diagram of a scenario for mapping a layout of an environment, in accordance with exemplary aspects of the present disclosure.

FIG. 1 is a diagram of a scenario for mapping a layout of environment 100, in accordance with exemplary aspects of the present disclosure. Suppose that environment 100 is a grocery store and camera 102 is installed near the ceiling of environment 100. The visual stream captured by camera 102, which may be a video or a series of periodic images marked by timestamps, may be transmitted to computing device 400. Computing device 400 may be a computer, a laptop, a smartphone, a server, or any device capable of receiving the visual stream from camera 102 and processing it using a layout mapping component 415 (discussed in FIGS. 4-6). Computing device 400 may be located in environment 100 or away from/outside of environment 100. Furthermore, camera 102 may be connected to computing device 400 wirelessly (e.g., via Bluetooth, Wi-Fi, etc.) or through a wired connection (e.g., USB).

Environment 100 may include door 112 and landmarks 110 (e.g., shelves, fridges, racks, etc.). A plurality of persons such as person 104 and person 106 may walk through environment 100. Person 104 and 106 may be employees, customers, managers, security officers, etc. When walking, for example, person 104 may take path 108, which represents the route person 104 takes as captured by camera 102. For simplicity, path 108 is extended to the right edge of environment 100 (even though person 104 has only walked mid-way. This is to show the complete route person 104 takes while being captured by camera 102.

Figure 2:
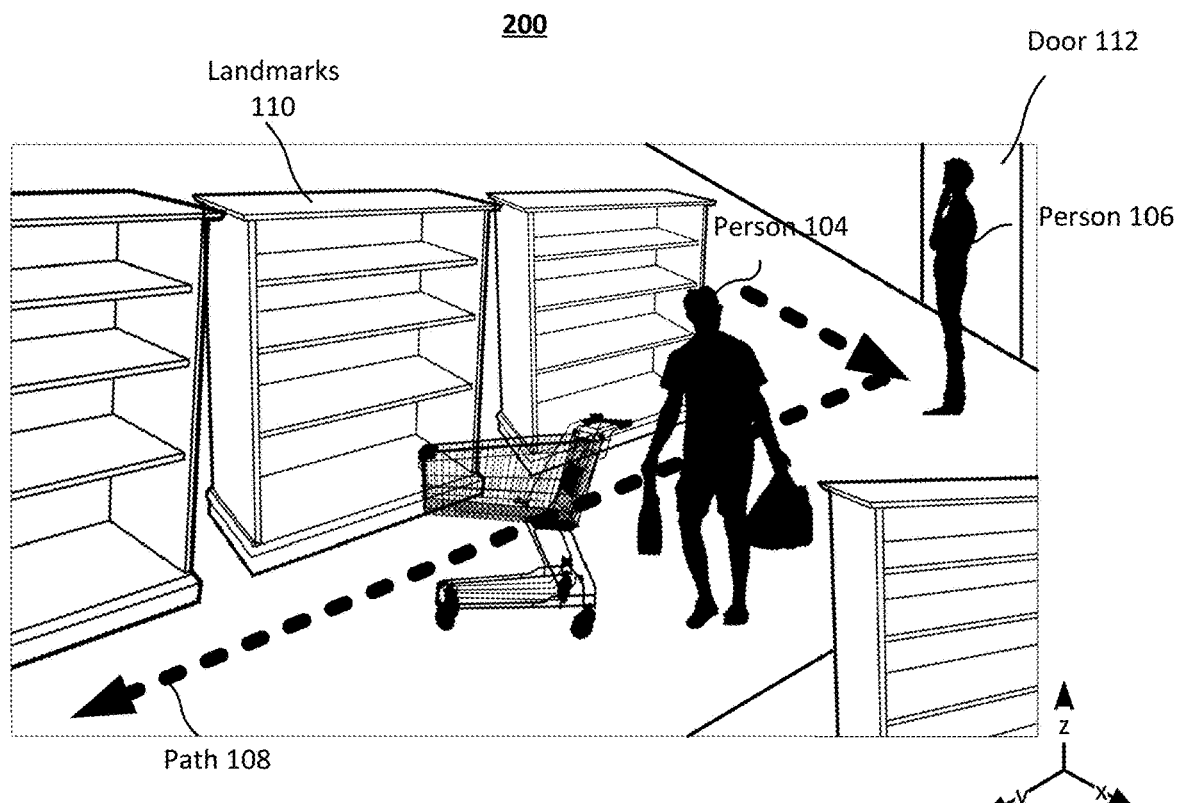
FIG. 2 is a diagram of a view of the camera in FIG. 1, in accordance with exemplary aspects of the present disclosure.

FIG. 2 is a diagram of view 200 of camera 102 in FIG. 1, in accordance with exemplary aspects of the present disclosure. As can be seen, the field of vision (FoV) of camera 102 is bound in a rectangular shape. Accordingly, camera 102 can only capture person 104 and 106, a portion of door 112, a portion of path 108, and a portion of landmarks 110. Furthermore, from the perspective of camera 102, person 104 is walking towards camera 102. Because camera 102 is placed in an arbitrary position in environment 100, the positional parameters of camera 102 are unknown (unless specified by a user that installed the camera or has the positional parameters). The positional parameters of camera 102 comprise at least one of: camera installation height, tilt angle, FoV, or focal length. Because all objects depicted in view 200 are nearby or far away relative to camera 102, determining the positional parameters is necessary to generate a layout of environment 100. By determining the positional parameters, the dimensions of environment 100 can be determined relative to camera 102. In the present disclosure, these values are updated iteratively to generate a more accurate layout of environment 100 (as viewed in view 200). As more persons enter and exit the view of environment 100, computing device 400 is better able to determine the depth, width, and height of environment 100 based on how quickly the persons walk and their approximate heights.

Figure 3:
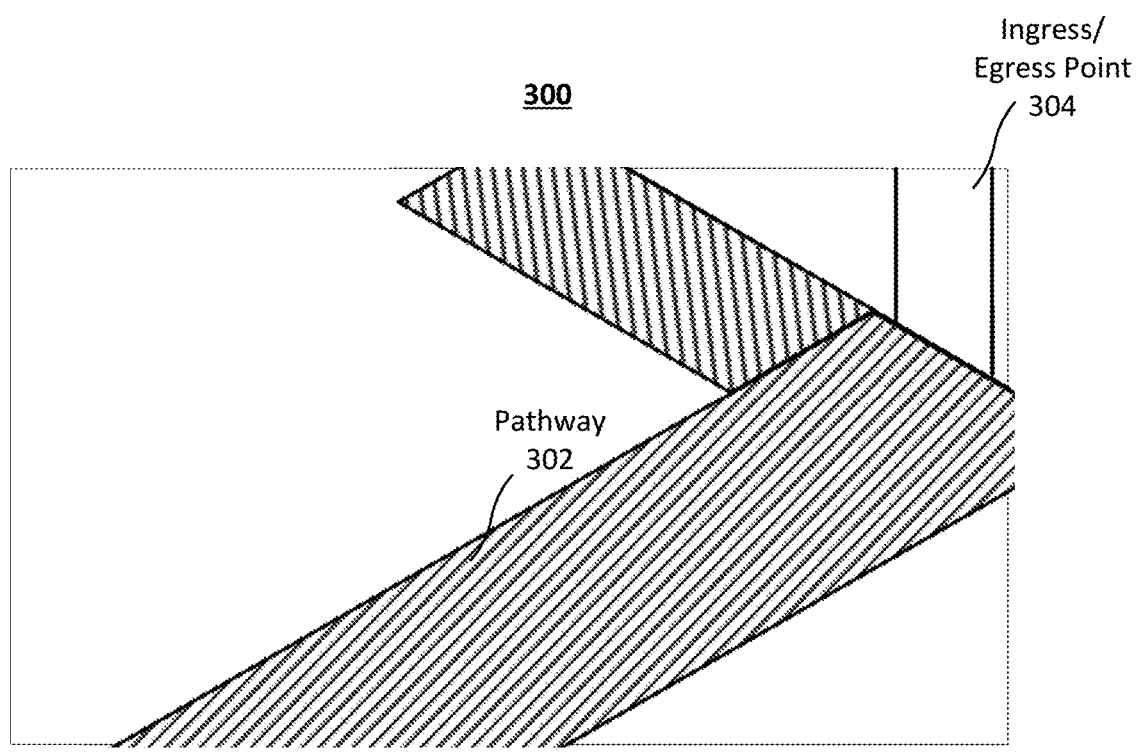
FIG. 3 is a diagram of a layout of the environment in FIG. 1, in accordance with exemplary aspects of the present disclosure.
Figure 5:
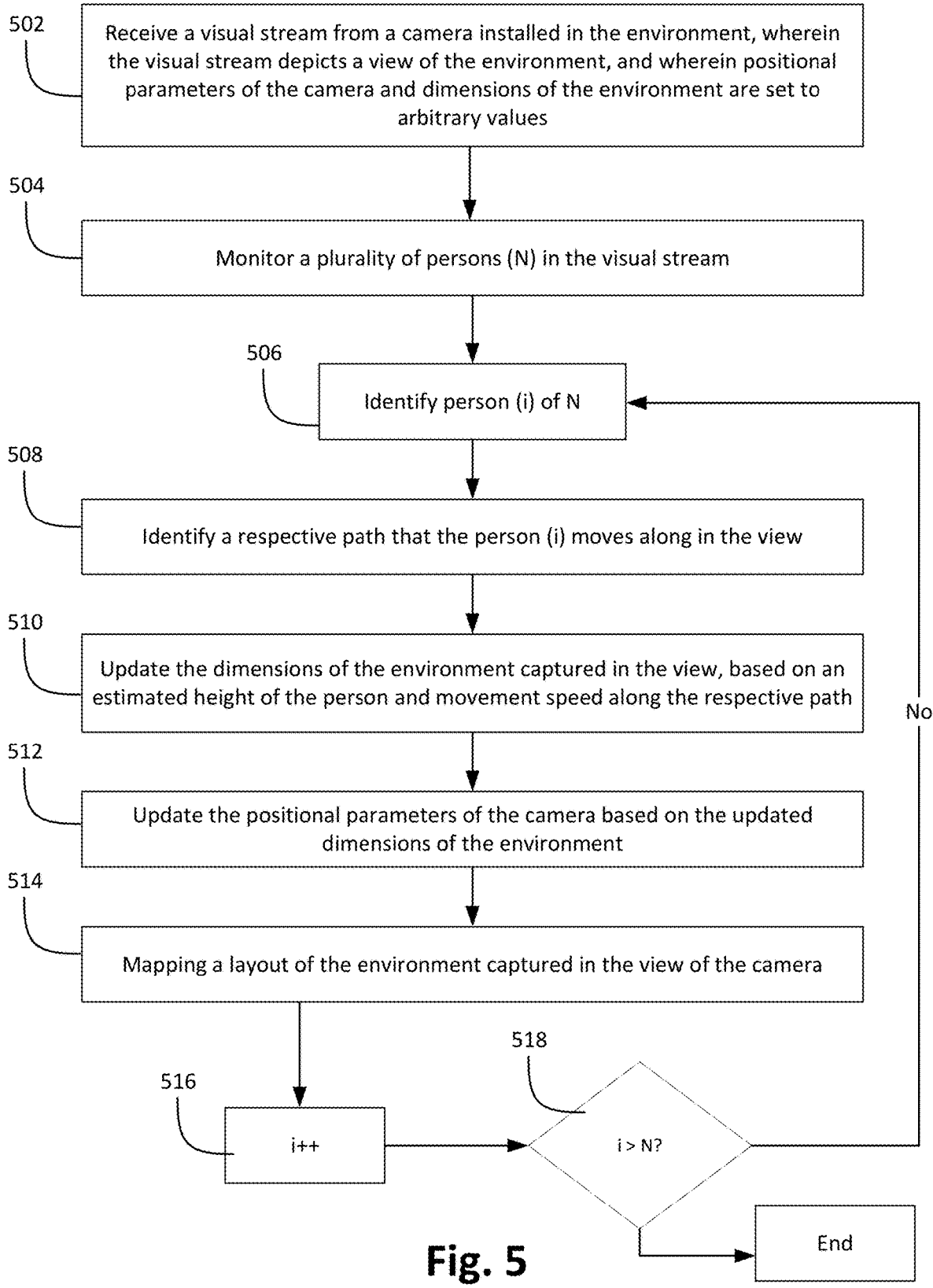
FIG. 5 is a flowchart illustrating a method of iteratively mapping a layout of an environment, in accordance with exemplary aspects of the present disclosure.

FIG. 3 is a diagram of layout 300 of environment 100 in FIG. 1, in accordance with exemplary aspects of the present disclosure. FIG. 5 will later describe mapping layout 300 of environment 100. However, as shown in FIG. 3, pathway 302 is visually labelled and so is ingress/egress point 304. Pathway 302 represents an aggregate of all routes taken by the plurality of persons in environment 100. Ingress/egress point 304 represents a portion of view 200 (used interchangeably with frame 200) in which persons appear and disappear from the FoV. Pathway 302 and point 304 may be labeled with distances and measurements (e.g., the width of pathway 302 is 5 feet).

In some aspects, layout 300 may be used to identify pathways in environment 100 that are most often used. This allows someone that monitors environment 100 (e.g., an owner of a store) to notice hot spots where several people gather. If those people are customers, the owner may consider rearranging the stock of items to place more popular items near the hot spots for easier access. In some cases, the owner may need to know whether people are following rules in environment 100. For example, if social distancing rules are in place and people need to be 6 feet apart, the owner may determine whether the aisles need to be rearranged because people are too close and violate the rules too often. Thus, layout mapping component 415 of the present disclosure may offer several real-world benefits beyond providing a technically-improved apparatus and method of mapping.

Figure 4:
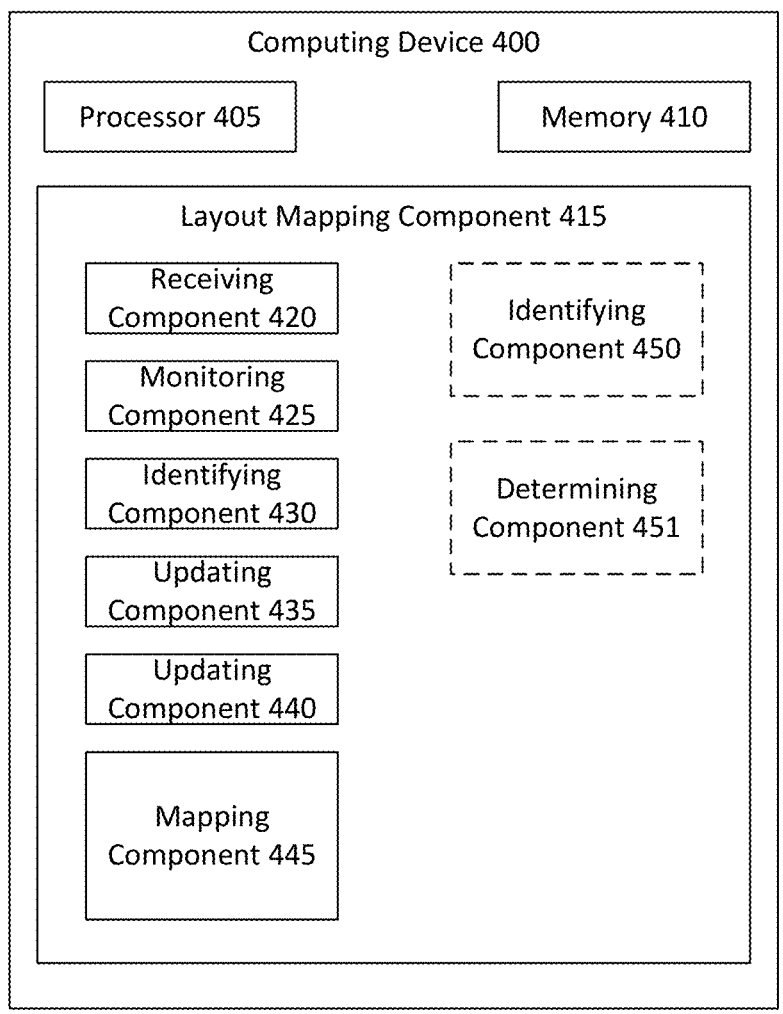
FIG. 4 is a block diagram of a computing device executing an layout mapping component, in accordance with exemplary aspects of the present disclosure.

FIG. 4 is a block diagram of computing device 400 executing an layout mapping component 415, in accordance with exemplary aspects of the present disclosure. FIG. 5 is a flowchart illustrating method 500 of iteratively mapping a layout of an environment, in accordance with exemplary aspects of the present disclosure. Referring to FIG. 4 and FIG. 5, in operation, computing device 400 may perform method 500 of iteratively mapping a layout of an environment via execution of layout mapping component 415 by processor 405 and/or memory 410.

At block 502, the method 500 includes receiving a visual stream from a camera installed in the environment, wherein the visual stream depicts a view of the environment, and wherein positional parameters of the camera and dimensions of the environment are set to arbitrary values. For example, in an aspect, computer device 400, processor 405, memory 410, layout mapping component 415, and/or receiving component 420 may be configured to or may comprise means for receiving a visual stream from camera 102 installed in environment 100, wherein the visual stream depicts view 200 of environment 100, and wherein positional parameters of the camera and dimensions of environment 100 are set to arbitrary values.

As mentioned before, suppose that the position parameters of camera 102 are camera installation height, tilt angle, field of vision (FoV), and/or focal length. Layout mapping component 415 may set each parameter to an initial value (e.g., installation height is 5 feet, tilt angle is 20 degrees downward relative to the wall of environment 100 where camera 102 is installed, field of vision is 40 feet, etc.). Because layout mapping component 415 does not actually know the real values of these parameters, they are updated iteratively during method 500. In particular, layout mapping component 415 receives the visual stream from camera 102 and identifies people in the received frames of the stream.

At block 504, the method 500 includes monitoring a plurality of persons (N) in the visual stream. For example, in an aspect, computer device 400, processor 405, memory 410, layout mapping component 415, and/or monitoring component 425 may be configured to or may comprise means for monitoring a plurality of persons (e.g., person 104, person 106) in the visual stream.

Suppose that view 200 represents a frame of the visual stream received by layout mapping component 415. Monitoring component 425 may utilize computer vision techniques such as person recognition to identify person 104 and person 106 in the frame. In response to detecting person 104 and person 106, monitoring component 425 may track the movements of each person. For example, over a plurality of frames (e.g., 300 frames provided over 10 seconds), person 104 may move along path 108 and person 106 may enter through door 112 and stand still.

At block 506, the method 500 includes identifying person (i) of N. For example, in an aspect, computer device 400, processor 405, memory 410, layout mapping component 415, and/or monitoring component 425 may be configured to or may comprise means for identifying person 104 in the visual stream.

For example, layout mapping component 415 may analyze each person identified one at a time. The value of N represents the total number of identified persons and (i) represents the number of the person. Initially the value of (i) may be 1, indicating that the first person is being identified (e.g., person 104). In this example, the value of N is 2 for simplicity. However, N may change as more individuals are captured by camera 102 over time. In addition, layout mapping component 415 may set the initial estimated height and movement speed of person 104 to predetermined values. The predetermined values may be dependent on the region in world that the camera 102 is located in. For example, the average height for a man in America is 5 feet 9 inches and the average walking speed is 3 miles per hour.

At block 508, the method 500 includes identifying a respective path that the person moves along in the view. For example, in an aspect, computer device 400, processor 405, memory 410, layout mapping component 415, and/or identifying component 430 may be configured to or may comprise means for identifying path 108 that person 104 moves along in view 200.

In some aspects, identifying component 430 may treat each person as a point and monitor how the point travels across the plurality of frames that the point appears in. For example, a point on person 104 may be on the head of person 104. Identifying component 430 may, in some aspects, create a three-dimensional x-y-z representation of environment 100 that is relative to the walls and floor captured in view 200. For example, the wall near person 106 includes door 112. The height-wise line of the door may be characterized as parallel to the z-axis. The width-wise line of the door may be characterized as parallel to the x-axis. The y-axis may be determined as the axis perpendicular to both the x-axis and the z-axis. Path 108 can therefore be conveyed as a combination of vectors. The first vector is parallel to the x-axis and the second vector is parallel to the y-axis.

At block 510, the method 500 includes updating the dimensions of the environment captured in the view, based on an estimated height of the person and movement speed along the respective path. For example, in an aspect, computer device 400, processor 405, memory 410, layout mapping component 415, and/or updating component 435 may be configured to or may comprise means for updating the dimensions of environment 100 (e.g., lengths along the x-axis, y-axis, and z-axis) captured in view 200, based on an estimated height of person 104 and movement speed along path 108.

For example, the first portion of path 108 is parallel to the x-axis. If person 104 walks along the first portion for 2 seconds and is estimated to walk 4 feet per second, the length of the vector representing the first portion of the path is determined by layout mapping component 415 as 8 feet. Updating component 435 can extrapolate this information by determining that the first portion represents a third of the pixels along the x-axis. Therefore, the environment 100 is at least 24 feet along the x-axis.

As person 104 walks along the second portion of path 108 (e.g., the line perpendicular to the y-axis, person 104 may walk for 4 seconds. Accordingly, layout mapping component 415 may determine that the second portion is 16 feet in length. Extrapolating on this data, updating component 435 may determine that the second portion represents 80% of the pixels along the y-axis, which would mean that environment 100 is at least 20 feet along the y-axis.

Furthermore, because the height of person 104 is estimated to be 5 feet 9 inches (the predetermined value) along the z-axis, updating component 435 may determine the amount of pixels along the z-axis that person 104 measures out to be and may extrapolate the height of environment 100. For example, updating component 435 may extend a line from the feet of person 104 to the top of a frame (along the z-axis) and determine the number of pixels in the line that are of person 104. Suppose that only 50% of the pixels in the line are of person 104. This would mean that a remaining 5 feet 9 inches above person 104 represents environment 100. Accordingly, updating component 435 may determine that the height of environment 100 is at least 11.5 feet.

In some aspects, knowing the physical length (i.e., real life length) a group of pixels represents, updating component 435 may determine the measurements of various objects in view 200. For example, updating component 435 may determine the dimensions of landmarks 110.

At block 512, the method 500 includes updating the positional parameters of the camera based on the updated dimensions of the environment. For example, in an aspect, computer device 400, processor 405, memory 410, layout mapping component 415, and/or updating component 440 may be configured to or may comprise means for updating the positional parameters (e.g., tile angle, installation height, FoV, focal length) of camera 102 based on the updated dimensions of environment 100.

For example, updating component 440 may utilize a machine learning algorithm that is trained to output a tilt angle, a camera installation height, a FoV, a focal length, or any combination thereof. The machine learning algorithm may be trained on a dataset that includes a variety of dimensional inputs and camera information (e.g., model number, resolution, etc.) and their associated positional parameter outputs. Among the dimensional inputs may be perceived height of the environment (e.g., floor to ceiling), perceived distance of farthest and/or closest point in the view, whether a majority of persons/objects are captured via an overhead view or not, the perceived width of the environment, etc. The machine learning algorithm may use linear/polynomial regression. Accordingly, when the dimensional inputs are camera information are inputted into the machine learning algorithm, updating component 440 may determine the new positional parameters of the camera and update its records (e.g., store in memory).

At block 514, the method 500 includes mapping a layout of the environment captured in the view of the camera. For example, in an aspect, computer device 400, processor 405, memory 410, layout mapping component 415, and/or mapping component 445 may be configured to or may comprise means for mapping a layout of environment 100 captured in the view of camera 102.

Layout 300 includes at least one of: a pathway where the plurality of persons can move, a landmark in environment 100 (e.g., detected using object recognition algorithms), or an ingress/egress point in environment 100. In terms of pathways, mapping component 445 may aggregate each respective path to determine the pathway. For example, as multiple persons walk in environment 100, their movement is tracked at represented as vectors. Adding these vectors provides a combinations of movements in areas where walking is permitted. By estimating the width of each person and their motion, the dimensions of each pathway (which may be a combination of physical roads or aisles) may be extrapolated. More specifically, the vectors may be stored in memory 410 and tagged with an identifier comprising the approximate width of each person associated with the vector.

Ingress/egress points may be identified by mapping component 445 using a combination of object recognition (to identify doors) and detecting appearance/disappearance of a tracked person in a frame. For example, if a person appears within the frame and disappears within the frame (rather than by exiting from an edge of the frame), mapping component 445 determines that the person is entering and exiting through a door.

At block 516, the method 500 includes incrementing (i). For example, in an aspect, computer device 400, processor 405, memory 410, layout mapping component 415, and/or monitoring component 425 may be configured to or may comprise means for incrementing (i) by 1.

At block 518, the method 500 includes determining whether (i) is greater than N. For example, in an aspect, computer device 400, processor 405, memory 410, layout mapping component 415, and/or monitoring component 425 may be configured to or may comprise means for determining whether (i) is greater than N. If (i) is not greater than N, there are other persons in the plurality of persons that still have to be monitored and analyzed. Accordingly, method 500 returns to block 506, where the subsequent person (e.g., person 106) is identified.

If (i) is greater than N, method 500 ends. In some aspects, layout mapping component 415 may generate a graphical user interface on computing device 400 (e.g., via a peripheral device such as a monitor) that displays layout 300 (i.e., the output of block 514). This enables a user monitoring environment 100 to see the dimensions of environment 100, the pathways used, the ingress/egress points, landmarks, etc., without manually specifying where camera 102 is placed. In some aspects, layout 300 may identify routes that are most often used (e.g., by differentiating color of routes) so that the user can view areas of environment 100 that experience the most foot traffic.

In the initial estimation of the dimensions of environment 100 and the positional parameters of camera 102, the height of person 104 and movement speed was predetermined. Depending on the real life height and speed of person 104, the estimates may be incorrect. Aspects of the present disclosure iteratively update the dimensions of environment 100 and the positional parameters to ensure that over time, the true dimensions of environment 100 are determined.

In other words, person 104 may be in fact 5 feet 6 inches and person 106 may be 6 feet exactly. The average height between the two persons is 5 feet 9 inches. Accordingly, if the dimensions of environment 100 are first determined based on the assumption that the height of person 104 is 5 feet 9 inches and the dimensions of environment 100 are again determined based on the assumption that the height of person 106 is 5 feet 9 inches, averaging out both determined dimensions of environment 100 will in fact yield the true dimensions of environment 100. This is a simplistic example in which the heights of two individuals averages to the predetermined height. However, depending on the persons captured by camera 102, averaging the dimensions of environment 100 and the positional parameters of camera 102 to get their true values may require several persons to be captured.

Thus, after the actions of blocks 510 and 512 are performed for the first person identified, blocks 510 and 512 for the second person and all subsequently identified persons further comprise averaging the dimensions with the dimensions determined using the movement of the previous person. Suppose that person 106 also walks along path 106. Updating components 435 and 440 will re-determine the dimensions of environment 100 and the positional parameters of camera 102 based on the assumption that person 106 is also 5 feet 9 inches. Subsequently, updating component 435 will set the latest values of the dimensions of environment 100 as the average values between the dimensions calculated for person 104 and the dimensions calculated for person 106. Updating component 440 will set the latest values of the positional parameters as the average values between the parameters calculated for person 104 and the parameters calculated for person 106.

It should be noted that although the example of people is given, layout mapping component 415 may also monitor other moving objects to approximate the dimensions of an environment. For example, if a camera is placed in a parking lot, objects such as cars can be used. Initial estimates of vehicle speed and vehicle dimensions can be applied such that the concept of marking pathways can be implemented with the use of vehicles. Accordingly, the methods discussed in the present disclosure are applicable such that persons are replaced with vehicles or, in some aspects, are considered along with vehicles.

In some aspects, subsequent to a threshold number of persons being analyzed (e.g., 100 individuals), layout mapping component 415 may update the estimated height of the person and the movement speed based on the updated positional parameters of the camera. For example, the 101th person to be captured by camera 102 may be assigned his/her own estimated height rather than the predetermined height. This is because the first threshold number of persons are used to calibrate camera 102. Assuming that the average height of the 100 individuals is 5 feet 9 inches, the height of the 101th person can be determined based on the conversion between physical distance and pixels of the frame.

Figure 6:
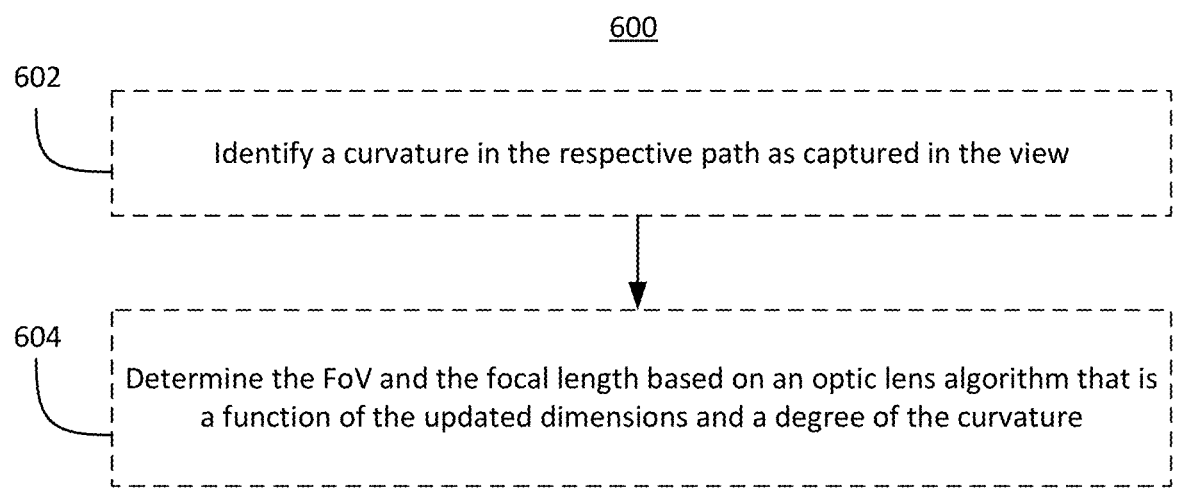
FIG. 6 is a flowchart illustrating a method of updating the FoV and the focal length of the camera, in accordance with exemplary aspects of the present disclosure.

FIG. 6 is a flowchart illustrating method 600 of updating the FoV and the focal length of the camera, in accordance with exemplary aspects of the present disclosure.

At block 602, the method 600 includes identifying a curvature in the respective path as captured in the view. For example, in an aspect, computer device 400, processor 405, memory 410, layout mapping component 415, and/or identifying component 450 may be configured to or may comprise means for identifying a curvature in path 108 as captured in view 200.

Under the assumption that people generally walk in straight paths, if path 108 has a curvature such that the vector describing path 108—particularly the second portion of path 108—is represented by a plurality of unique vectors, identifying component 450 may determine that the stream captured by camera 102 comprises warping. Due to the warping, straight movements in the real physical world have a curvature in the stream.

At block 604, the method 600 includes determining the FoV and the focal length based on a machine learning algorithm that is a function of the updated dimensions and a degree of the curvature/warping. For example, in an aspect, computer device 400, processor 405, memory 410, layout mapping component 415, and/or determining component 451 may be configured to or may comprise means for determining the FoV and the focal length based on a machine learning algorithm that is a function of the updated dimensions and a degree of the curvature.

As mentioned before, the FoV and the focal length may be determined via a machine learning algorithm that receives dimensional inputs (i.e., the updated dimensions). In addition, the machine learning algorithm may receive a degree of curvature/warping, which is determined based on the movement of a person. Based on the assumption that people generally walk in straight paths, if the camera detects a consistent curvature in the paths that people take (e.g., a certain percentage of persons show the same curvature while walking along an aisle in a supermarket—despite the aisle being straight), the curvature may be attributed to the camera. For example, the camera may be in a "wide-angle" mode or "fish-eye" mode. The degree of curvature is a mathematical represent of the magnitude of warping (e.g., in radians/m). The FoV and focal length may thus be determined using a machine learning algorithm configured to receive dimensional inputs and a degree of curvature in order to output the FoV and focal length.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for iteratively mapping a layout of an environment, comprising:
receiving a visual stream from a camera installed in the environment, wherein the visual stream depicts a view of the environment, and wherein positional parameters of the camera, comprising field of vision (FoV) and focal length, and dimensions of the environment are set to arbitrary values;
monitoring a plurality of persons in the visual stream; and
for each person in the plurality of persons:
identifying a respective path that the person moves along in the view;
updating the dimensions of the environment captured in the view, based on an estimated height and movement speed of the person along the respective path;
updating the positional parameters of the camera by:
identifying a curvature in the respective path as captured in the view; and
updating the FoV and the focal length based on a machine learning algorithm that is a function of the updated dimensions and a degree of the curvature; and
mapping a layout of the environment captured in the view of the camera.

2. The method of claim 1, wherein an initial estimated height and movement speed of the person are set to predetermined values.

3. The method of claim 2, further comprising for each person in the plurality of persons, averaging each of the dimensions of the environment and the positional parameters.

4. The method of claim 1, wherein the positional parameters of the camera further comprise at least one of: camera installation height, and tilt angle.

5. The method of claim 1, wherein the layout identifies at least one of: a pathway where the plurality of persons can move, a landmark in the environment, or an ingress/egress point in the environment.

6. The method of claim 5, wherein mapping the layout comprises aggregating each respective path to determine the pathway.

7. An apparatus for iteratively mapping a layout of an environment, comprising:
a memory; and
a processor configured to communicate with the memory and configured to:
receive a visual stream from a camera installed in the environment, wherein the visual stream depicts a view of the environment, and wherein positional parameters of the camera comprising field of vision (FoV) and focal length,- and dimensions of the environment are set to arbitrary values;
monitor a plurality of persons in the visual stream; and
for each person in the plurality of persons:
identify a respective path that the person moves along in the view;
update the dimensions of the environment captured in the view, based on an estimated height and movement speed of the person along the respective path;
update the positional parameters of the camera by:
identifying a curvature in the respective path as captured in the view; and
updating the FoV and the focal length based on a machine learning algorithm that is a function of the updated dimensions and a degree of the curvature; and
map a layout of the environment captured in the view of the camera.

8. The apparatus of claim 7, wherein an initial estimated height and movement speed of the person are set to predetermined values.

9. The apparatus of claim 8, wherein the processor is further configured to, for each person in the plurality of persons, average each of the dimensions of the environment and the positional parameters.

10. The apparatus of claim 7, wherein the positional parameters of the camera further comprise at least one of: camera installation height, and tilt angle.

11. The apparatus of claim 7, wherein the layout identifies at least one of: a pathway where the plurality of persons can move, a landmark in the environment, or an ingress/egress point in the environment.

12. The apparatus of claim 11, wherein to map the layout the processor is configured to aggregate each respective path to determine the pathway.

13. A non-transitory computer-readable medium for iteratively mapping a layout of an environment, executable by a processor to:
 receive a visual stream from a camera installed in the environment, wherein the visual stream depicts a view of the environment, and wherein positional parameters of the camera, comprising field of vision (FoV) and focal length, and dimensions of the environment are set to arbitrary values;
monitor a plurality of persons in the visual stream; and
for each person in the plurality of persons:
 identify a respective path that the person moves along in the view;
 update the dimensions of the environment captured in the view, based on an estimated height and movement speed of the person along the respective path;
 update the positional parameters of the camera by:
  identifying a curvature in the respective path as captured in the view; and
  updating the FoV and the focal length based on a machine learning algorithm that is a function of the updated dimensions and a degree of the curvature; and
 map a layout of the environment captured in the view of the camera.

* * * * *